(12) United States Patent
Wolf

(10) Patent No.: US 6,418,142 B1
(45) Date of Patent: Jul. 9, 2002

(54) PROCESS AND DEVICES FOR ESTABLISHING POINT-TO-MULTIPOINT CONNECTIONS AND MULTIPOINT-TO-POINT CONNECTIONS

(75) Inventor: Michael Wolf, Mundelsheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/153,704

(22) Filed: Sep. 15, 1998

(30) Foreign Application Priority Data

Sep. 20, 1997 (DE) .......................................... 195 41 577

(51) Int. Cl.⁷ ........................... H04L 12/28; H04L 12/56
(52) U.S. Cl. ....................................... 370/390; 370/388
(58) Field of Search ................................ 370/390, 367, 370/386, 387, 388, 392, 395, 400, 404, 405, 360, 361, 411

(56) References Cited

U.S. PATENT DOCUMENTS

| | | | | |
|---|---|---|---|---|
| 5,309,430 A | * | 5/1994 | Verhille et al. ............. | 370/397 |
| 5,438,566 A | | 8/1995 | Masetti et al. ............. | 370/355 |
| 5,440,546 A | * | 8/1995 | Bianchini, Jr. et al. ..... | 370/413 |
| 5,451,936 A | | 9/1995 | Yang et al. ................ | 340/2.22 |
| 5,461,615 A | * | 10/1995 | Henrion ...................... | 370/355 |
| 5,802,049 A | * | 9/1998 | Watanabe .................... | 370/390 |
| 6,101,190 A | * | 8/2000 | Song .......................... | 370/411 |

FOREIGN PATENT DOCUMENTS

| | | |
|---|---|---|
| DE | 4391854 | 11/1993 |
| DE | 19605873 | 8/1997 |
| DE | 19610334 | 9/1997 |

OTHER PUBLICATIONS

ITU–T, Telecommunication Standardization Sector of ITU, G.841 (Draft), General Aspects of Digital Transmission Systems, Types and Characterisctics of SDH Network Prot. Architectures.

"Sonet/SDH Multicast Routing Algorithms in Symmetrical Three Stage Networks" by Won–Bae Park et al, Proceedings of the 1995 IEEE In'tl Conf. on Communications, Jun. 1995, 1912–1917.

"Three–Stage Switching Networks for N:1 Multiconnection", Electronics & Communications in Japan . Part I. Jul. 1988, pp. 66–74.

* cited by examiner

Primary Examiner—Douglas Olms
Assistant Examiner—Phirin Sam
(74) Attorney, Agent, or Firm—Ware, Fressola, Van Der Sluys & Adolphson LLP

(57) ABSTRACT

The present invention relates to a process for establishing point-to-multipoint connections (A14, A33, A34) and multipoint-to-point connections (B14, B15, B35) in a coupling field comprised of a number of stages (I, II, III), each with a number of switching modules (11–15, 21–25, 31–35). To that end, when there are switching modules (21–25) in at least one stage (II), and if, depending on their type, these switching modules are capable of simultaneously splitting point-to-multipoint connections (A14, A33, A34) and of coupling together multipoint-to-point connections (B14, B15, B35), the proposition is made to connect point-to-multipoint connections (A14, A33, A34) in switching modules (25) in which more inputs than outputs are already loaded with connections and to connect multipoint-to-point connections (B14, B15, B35) by switching modules (24) in which more outputs than inputs are already loaded with connections.

5 Claims, 3 Drawing Sheets

PROCESS AND DEVICES FOR ESTABLISHING POINT-TO-MULTIPOINT CONNECTIONS AND MULTIPOINT-TO-POINT CONNECTIONS

TECHNICAL FIELD

The present invention relates to a process for establishing point-to-multipoint connections and multipoint-to-point connections in a coupling field, comprised of a number of stages, each with a number of switching modules, each of which has a number of inputs and outputs that can be freely connected to one another. It is also directed to a related a coupling field, control device, and switching center.

BACKGROUND OF THE INVENTION

The splitting of an incoming connecting line in a coupling field into a number of continuing connecting lines and the coupling together of a number of incoming connecting lines in another coupling field into a common, continuing connecting line are known in the field of SDH technology (synchronous digital hierarchy) from the ITU-T Recommendation G.841 (DRAFT) "Types and Characteristics of SDH Network Protection Architectures", April 1995 version, FIGS. 5–7 (p. 51). In the coupling fields represented there, each coupling field input is connected to a number of coupling field outputs by means of a point-to-multipoint connection and a number of coupling field inputs are connected to one coupling field output by means of a multipoint-to-point connection. The represented use of at least two different and independent, i.e. redundant, connecting paths increases the transmission reliability in telecommunication networks or parts of them. A first pair that is comprised of a data source and a data sink indicated by arrows are connected by way of a first coupling field ("matrix connection"), two redundant transmission path pairs, and a second coupling field ("matrix connection") to a second pair comprised of a data source and a data sink. The coupling fields mentioned are parts of SDH network nodes, so-called "cross-connects". The disposition of the transmission paths in pairs here is necessary for a transmission in full-duplex mode. For a transmission in half-duplex mode or for a unidirectional transmission, only one channel of each of the transmission path pairs would be required. The transmission path pair that is active for data transmission is called the SNCw connection (subnetwork connection working), the redundant transmission path pair is called SNCP connection (subnetwork connection protection). The transmission in one direction on each channel of the doubled transmission path pair will be represented below. In the opposite direction, the transmission is accordingly executed in reverse.

A data stream to be transmitted from the first data source to the second data sink is duplicated by the first coupling field and the data stream and its duplicate are transmitted to the data sink in parallel fashion, each on a channel of the redundant transmission paths SNCp and SNCw. Immediately upstream of the data sink, the data stream and its duplicate are received by the second coupling field on the redundant transmission paths and are coupled together. In so doing, the data stream and its duplicate are tested as to their quality so that as a result, if possible, a perfectly received data stream can be selected and conveyed to the data sink. If both of the redundant transmission paths do not fail or suffer interference simultaneously, then the data stream can be transmitted from the data source to the data sink in the above-described manner with a high degree of transmission quality and transmission reliability.

In conjunction with FIG. 1, first a situation is described that can result without the use of the process according to the invention. FIG. 1 shows a coupling field in three stages, each comprised of five switching modules, with currently used connections between the switching modules of the three stages. The coupling field is comprised of an input stage (I) with five switching modules 11, 12, 13, 14, and 15, an intermediary stage (II) with five switching modules 21, 22, 23, 24, and 25, and an output stage (III) with five switching modules 31, 32, 33, 34, and 35. Each of the respective five switching modules of the input stage (I) and the output stage (III) is connected to each of the five switching modules of the intermediary stage (II) via intermediary lines not shown in the FIG. However, connections that extend by way of these intermediary lines are in fact represented, so that a few intermediary lines can therefore be discerned indirectly. The intermediary lines are thus disposed between the input stage (I) and the intermediary stage (II) and between the intermediary stage (II) and the output stage (III). There is always an intermediary line between each output of a switching module of one stage and each input of a switching module of a neighboring stage. An intermediary line of this kind is used in FIG. 1, e.g. between the switching modules 11 and 21.

In the example represented, the switching modules each have five inputs and five outputs. One input of a switching module can be selectively connected inside the switching module to at least one output of the same switching module. An output of a switching module can likewise be selectively connected to at least one input of the same switching module. A switching module can simultaneously connect up to five independent connections between each of its inputs and each of its outputs. The switching modules 11 and 31 have this kind of a switching state. In these switching modules, like in most of the others of the coupling field, a direct switching through of the inputs and outputs is represented by horizontal lines between the inputs and the outputs. This is only intended to serve as a simple depiction.

If a connection through the coupling field of only one input of only one switching module of the input stage (I) leads to only one output of only one switching module of the output stage (III), then this reversible, definite connection is also called a "unicast connection". The "unicast connections" connected in FIG. 1 are represented by thin solid lines.

However, the connections described at the beginning are also possible, in which the data that are received by the coupling field on one of its inputs are duplicated and sent in parallel fashion on a number of its outputs. Here, constellations of this kind are called point-to-multipoint connections or "multicast connections". "Multicast connections" are depicted in the FIGs. with thick, dashed lines. A "multicast connection" of this kind is connected, for example, in the switching module 24 and on the input end, leads to the switching module 11 and on the output end, leads to the switching modules 31 and 32. Another "multicast connection" leads from the input A14 of the switching module 14, by way of the switching module 24 to the output A33 of the switching module 33 and to the output A34 of the switching module 34.

In a similar manner, a number of inputs of a coupling field can also be coupled together with a single one of its outputs into a connection that is called a multipoint-to-point connection here or is also called a "merge connection". "Merge connections" are represented in the FIGs. with thick, solid lines. The switching module 25 couples one such "merge connection" together between its inputs toward the switching modules 11 and 12 and its output toward the switching module 31. Another "merge connection" is produced between the inputs B14 and B15 of the switching modules 14 and 15 by way of the switching module 25 to the output B35 of the switching module 35. In a "merge connection", the data stream and its duplicate, which have been received in parallel on the input end by the coupling field, are tested as to their quality by the coupling switching module. If the data stream or its duplicate have been identified as error-free, then a single error-free data stream is selected and conveyed further to a single output. If neither the data stream nor the duplicate are error-free, then an error-encumbered data stream, possibly additionally marked especially because it contains errors, could also be supplied to the output.

Duplicated data streams are preferably transmitted on different line bundles. For incoming data streams, these line bundles then feed to different switching modules of the input stage (I) or for outgoing data streams, they begin at different switching modules of the output stage (III). "Merge connections" are advantageously already connected together in switching modules of the intermediary stage (II) in order to load only intermediary lines between the input stage (I) and the intermediary stage (II) with duplicated data streams and not the intermediary lines between the intermediary stage (II) and the output stage (III). Likewise, it is useful to split the "multicast connections" first in the switching modules of the intermediary stage (II) since only the intermediary lines between the intermediary stage (II) and the output stage (III) have to carry duplicated data streams. The coupling together of "merge connections" and splitting of "multicast connections" can also occur in switching modules of other stages of a coupling field, particularly also in coupling fields with more stages than in the coupling field shown in FIG. 1. In any case, as early a coupling as possible and as late a splitting as possible are advantageous.

From the arrangement of the connections in FIG. 1, for the switching module 24, it turns out that through the reduced utilization of the number of inputs in relation to the number of outputs, only the output to the switching module 35 remains usable. As a result, the connection a between switching module 12 and 24 is only continued on the switching module 35 and its outputs, but not on the outputs of the other switching modules of the output stage (III). The part of this "unicast connection" leading to the intermediary stage (II) is represented by a dashed, thin line in FIG. 1. A blocking inside the coupling field occurs if, due to a connect request, the connection a, which is represented in FIG. 1 by a dot-and-dash line, is intended to be conducted on an output of the switching modules 31–34.

A similar problem arises for the sole, as yet unoccupied output line b from the switching module 32. This line can be reached with the circuit arrangement represented in FIG. 1 by way of the switching module 25. The switching module 25, though, has only a single input free in FIG. 1, namely the one to switching module 13. When there is a connect request from one of the free inputs of the remaining switching modules of the input stage (I) toward the free output line b, another blocking occurs.

SUMMARY OF THE INVENTION

The object of the invention is to establish point-to-multipoint connections and multipoint-to-point connections in a coupling field of the type mentioned, taking into consideration the respective blocking probability.

This object is attained by a process for establishing point-to-multipoint connections and multipoint-to-point connections in a coupling field comprised of a number of stages, each with a number of switching modules, each of which has a number of inputs and outputs that can be freely connected to one another, wherein when there are switching modules in at least one stage in the coupling field, and if, depending on their type, these switching modules are capable of simultaneously splitting point-to-multipoint connections and coupling together multipoint-to-point connections, then point-to-multipoint connections are split by those switching modules in which more inputs than outputs are already loaded with connections and multipoint-to-point connections are coupled together by those switching modules in which more outputs than inputs are already loaded with connections.

It is also attained by a coupling field, which contains a number of stages, each with a number of switching modules each of which has a number of inputs and outputs that can be freely connected to one another, and a control device, wherein in at least one stage in the coupling field, there are switching modules which, depending on their type, are capable of simultaneously splitting point-to-multipoint connections and of coupling together multipoint-to-point connections, and that the control device permits the splitting of point-to-multipoint connections by those switching modules in which more inputs than outputs are already loaded with connections and permits the coupling together of multipoint-to-point connections by those switching modules in which more outputs than inputs are already loaded with connections.

It is further attained by a control device for a coupling field, which contains a number of stages, each with a number of switching modules each of which has a number of inputs and outputs that can be freely connected to one another, wherein in a coupling field of this kind, in which in at least one stage, there are switching modules which, depending on their type, are capable of simultaneously splitting point-to-multipoint connections and of coupling together multipoint-to-point connections, the control device permits the splitting of point-to-multipoint connections by those switching modules in which more inputs than outputs are already loaded with connections and permits the coupling together of multipoint-to-point connections by those switching modules in which more outputs than inputs are already loaded with connections.

It is also attained by a switching center with a coupling field, which contains a number of stages, each with a number of switching modules each of which has a number of inputs and outputs that can be freely connected to one another, and a control device, wherein in a coupling field of this kind, in which in at least one stage, there are switching modules which, depending on their type, are capable of simultaneously splitting point-to-multipoint connections and of coupling together multipoint-to-point connections, the control device permits the splitting of point-to-multipoint connections by those switching modules in which more inputs than outputs are already loaded with connections and permits the coupling together of multipoint-to-point connections by those switching modules in which more outputs than inputs are already loaded with connections.

Other advantageous embodiments of the invention can be inferred from the dependent claim and the description.

BRIEF DESCRIPTION OF THE DRAWINGS

In the following, the invention and its advantages will be represented in conjunction with an exemplary embodiment with the aid of the drawings.

BEST MODE FOR CARRYING OUT THE INVENTION

In "multicast connections" more outputs than inputs of a switching module are used. On the other hand, in "merge connections", more inputs than outputs of a switching module are required. "Merge" and "multicast connections" thus asymmetrically load a switching module in opposite ways with regard to the number of its utilized inputs and outputs. The terms "symmetry" and "asymmetry" will be used below in connection with the number of utilized inputs and outputs of a switching module. The proposal is now made, according to the invention, to use as symmetrical and equal as possible a number of inputs and outputs of a switching module for connections by virtue of the fact that a switching module with an asymmetrically higher loading of the outputs is selected for a "merge connection" and a switching module with an asymmetrically higher loading of the inputs is selected for a "multicast connection". To that end, an asymmetry parameter is advantageously supplied for each switching module on which the "merge" and "multicast connections" act in an inversely proportional manner. The asymmetry parameter could, for example, be a number that is respectively increased by the difference between the numbers of inputs and outputs used in "merge connections" and respectively decreased by this difference in "multicast connections". A symmetrical loading of a switching module is achieved when this asymmetry parameter is kept as low in amount as possible. Other kinds of procedures for producing the asymmetry parameter are possible, but will not be explained in detail here. For example, the number of inputs and outputs to be occupied and of already-occupied inputs and outputs of a switching module are each represented by a two-dimensional vector, whose differential vector should be comprised of two elements that are as equal as possible.

In the following, first, the use of the process according to the invention will be represented in accordance with a further development of the switching state from FIG. 2 into the switching state in FIG. 3. Both FIGs. represent the example of the coupling field known from FIG. 1, with respectively altered switching states. The switching state in FIG. 2 represents a possible preliminary stage to the switching states of FIG. 1 or FIG. 3 and without having to do anything special, can both feed into the unfavorable switching state of FIG. 1 and, through the use of the process according to the invention, can advantageously be developed into the switching state of FIG. 3.

Figure 2:
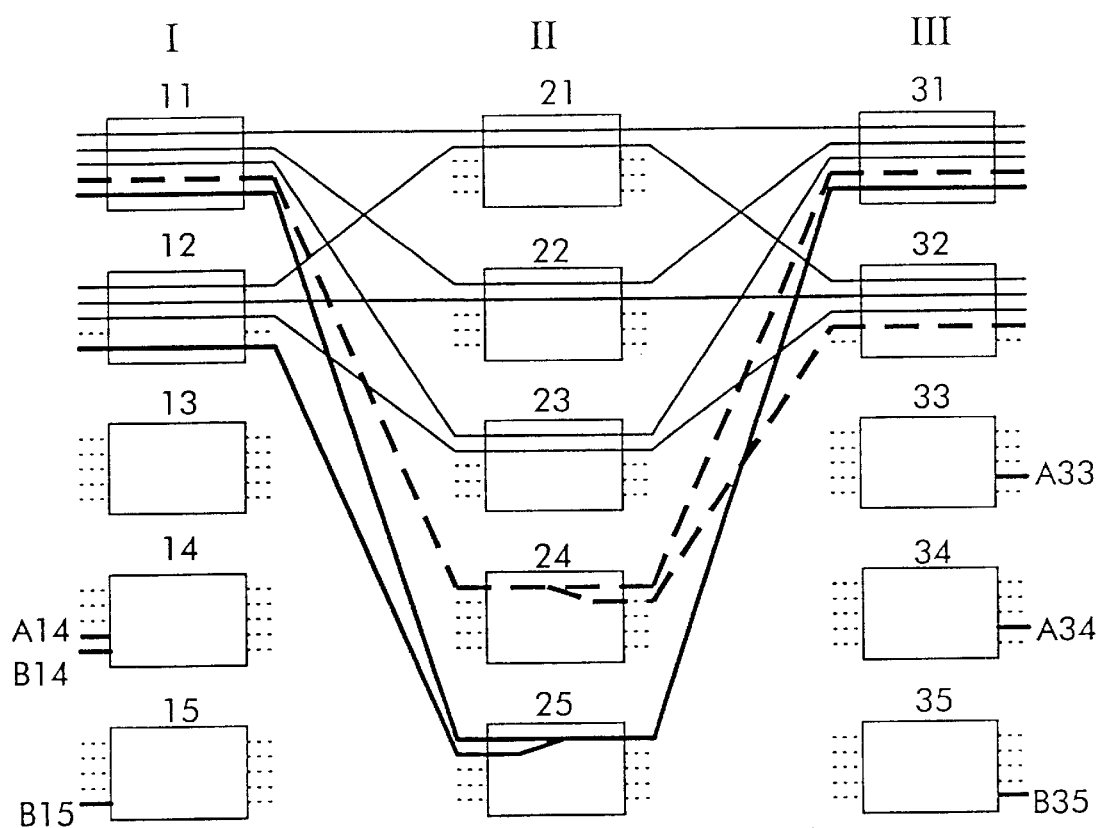
FIG. 2 shows the example of the coupling field mentioned in FIG. 1, with a switching state that is altered in relation to FIG. 1, as it could have existed before the switching state shown in FIG. 1.

In FIG. 2, the switching module 24 splits the multicast connection from switching module 11 to the switching modules 31 and 32. As a result, an asymmetrically higher load is produced on the output end and an asymmetry parameter with the value minus one is generated from the difference between one occupied input and two occupied outputs. The switching module 25 is asymmetrically loaded higher on the input end and has an asymmetry parameter with the value plus one, generated from the difference between two occupied inputs and one occupied output.

Now, the coupling field should produce a "merge connection" between the inputs B14 and B15 and the output B35, which will be called "merge connection B" below. A symmetrical loading of the switching modules will be provided for according to the invention. The abovementioned "merge connection", which places a higher load on the input end should be united by a switching module that has an asymmetrically higher load on its output end by means of "multicast connections". Therefore, according to the process according to the invention, the "merge connection B" is conducted by way of the switching module 24. The asymmetry parameter of the switching module 24 then assumes the value zero since due to the newly established "merge connection B", the value plus one, namely the difference between two occupied inputs and one occupied output, is added to the previous value minus one.

Furthermore, the coupling field in FIG. 2 should connect the input A14 to the outputs A33 and A34 by means of a "multicast connection", which will be called "multicast connection A" below. The "multicast connection A" loads the splitting switching module asymmetrically on the output side and influences its asymmetry parameter by the addition of the value plus 1, the difference between one occupied input and two occupied outputs. According to the invention, the "multicast connection A" should be split off from a switching module that has an asymmetrically higher load on the input side by means of "merge connections". Therefore, the "multicast connection A" is conducted by way of the switching module 25 so that the same numbers of inputs and outputs there are carrying a load and the asymmetry parameter of the switching module 25 becomes zero through the addition of the value plus one.

Figure 3:
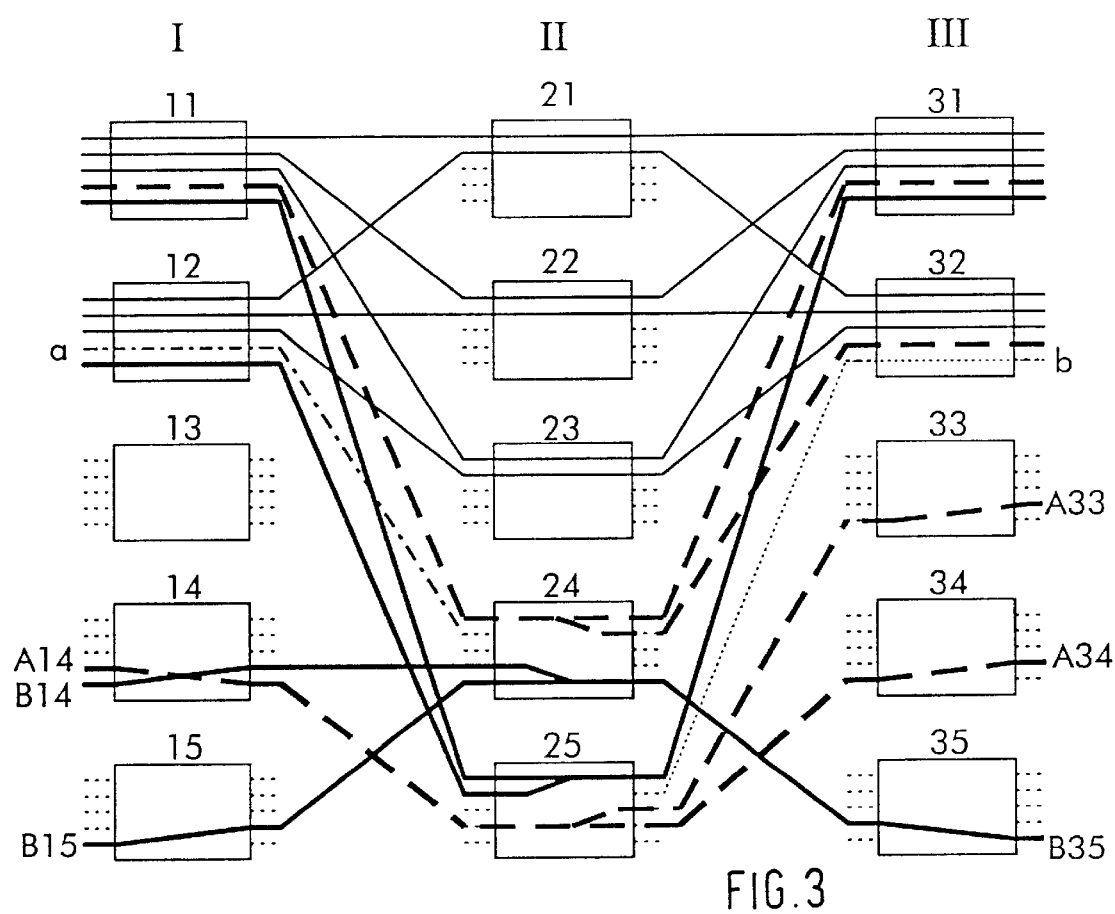
FIG. 3 shows the example of the coupling field known from FIG. 1, with a switching state that is altered in relation to FIG. 1, in which the process according to the invention has been advantageously used.

The above-described "multicast connection A" and "merge connection B", which are produced according to the invention, are represented in FIG. 3. Toward the outside, the coupling field in FIG. 3 has a relationship between the input interfaces of the input stage (I) and the output interfaces of the output stage (III) that is unchanged in relation to FIG. 1, i.e. in FIG. 1 and FIG. 3, the same inputs of switching modules of the input stage (I) are connected by way of connections within the coupling field to the same outputs of switching modules of the output stage (III).

Figure 1:
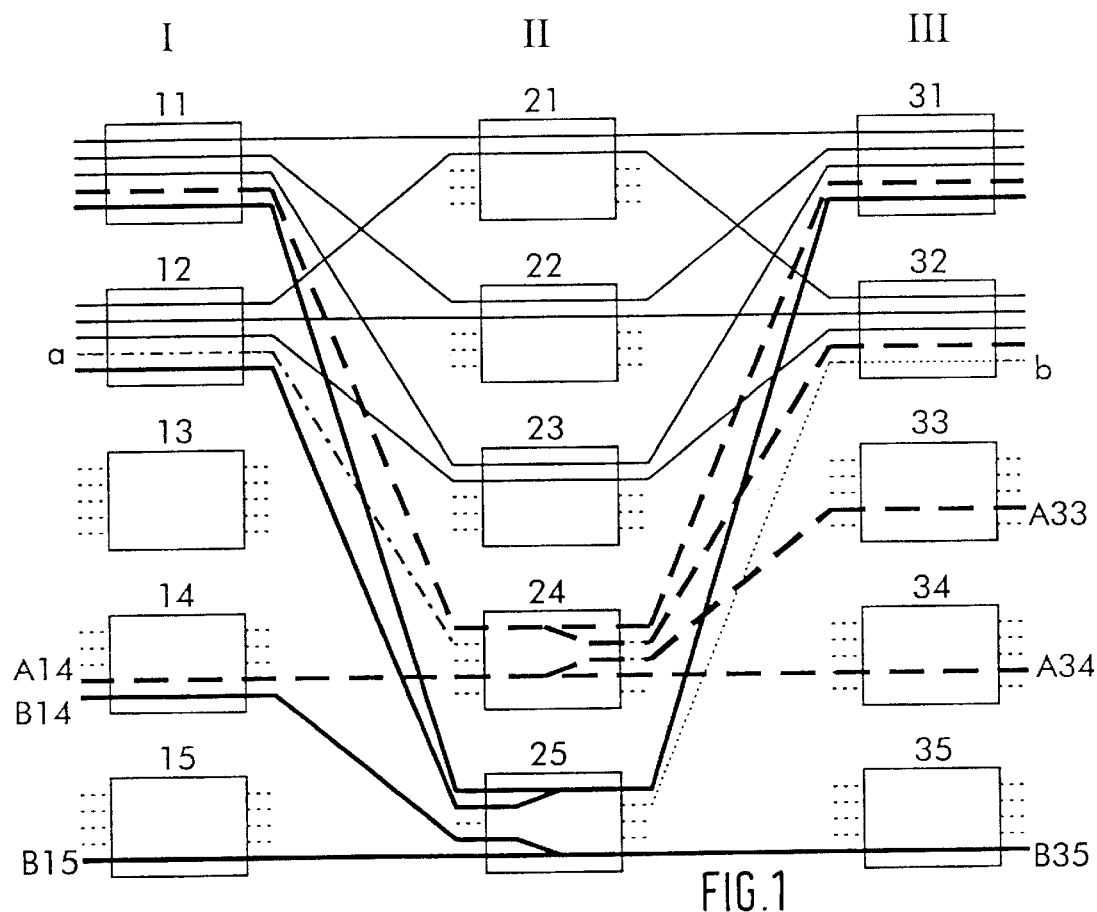
FIG. 1 shows an example of a coupling field with one of the possible switching states that can occur without the use of the process according to the invention.

The connection a mentioned at the beginning in relation to FIG. 1, which in that instance can lead from the switching module 12 by way of switching module 24 to the switching module 35 and can only be connected on its four outputs, is also represented further in FIG. 3. However, the connection a there can be continued on the free outputs of the switching module 33 as well as of the switching module 34. In total, then, eight outputs of the coupling field can be reached for the input of the connection a. The blocking probability is therefore halved in relation to the switching state in FIG. 1.

Also, the introductorily mentioned connection from the switching module 25 to the output b is taken up again in FIG. 3. By means of the switching state in FIG. 3, the output b can now be reached by the five inputs of the switching module 13 and can be additionally reached by the four free inputs of the switching module 15. Here, the blocking probability is reduced at a ratio of five to nine, i.e. is likewise nearly halved.

In addition to the described development of the switching state in FIG. 2 into the switching stage in FIG. 3, with the process according to the invention, it is also possible to transfer the switching state from FIG. 1 into the switching state of FIG. 3 within the framework of a so-called "rearrangement". In a "rearrangement" of this kind, for a connection to be regrouped, first a parallel connection path is produced within the coupling field by way of other switching modules and then a switching over to it occurs after its ability to function has been tested. Then, the prior connection path is freed. A "rearrangement" of the switching state shown in FIG. 1 will be described below.

In a "rearrangement" according to the process according to the invention, first the asymmetrically loaded switching modules in a coupling field are detected; in FIG. 1, these are the switching modules 24 and 25. Then a determination is made as to whether the asymmetry in these switching modules can be reduced by virtue of the fact that asymmetrically loading connections can be relocated into other switching modules and furthermore, connections that balance their own asymmetry can be taken over by other switching modules. For the switching state in FIG. 1, this analysis shows that in switching module 24, a "multicast connection" must be replaced by a "merge connection" and in switching module 25, a "merge connection" must be replaced by a "multicast connection". The asymmetry in switching module 24 is reduced by the relocation of the "multicast connection A" to the switching module 23 and at the same time, the possibility is achieved to conduct a "merge connection" by way of the switching module 24, which can then compensate for its still-existing asymmetry. To that end, in another step, the "merge connection B" is relocated from switching module 25 to switching module 24. In a subsequent step, the asymmetries in the switching modules 23 and 25 are eliminated by virtue of the fact that the "multicast connection A" is relocated from switching module 23 to switching module 25. A switching state is then produced, as shown in FIG. 3, with its already-described advantages.

As explained above, a "rearrangement" is costly and is very time consuming, particularly with cross-connects using SDH technology. Consequently, it is particularly advantageous from the start to embody the switching state by means of the process according to the invention described above in conjunction with FIGS. 2 and 3 so that in this way, the blocking probability, and therefore the probability for a "rearrangement", is kept low.

The process according to the invention can be used in arbitrary coupling fields. For this reason, the representation of the exemplary embodiments and the FIGs. are schematic representations.

For the process according to the invention, it is furthermore not relevant that all of the switching modules of one stage permit the establishment of "merge" and "multicast connections" because the method according to the invention can already be carried out with two of these switching modules in one stage.

In the event that a further increase of the transmission reliability requires more than two redundant transmission paths, the process according to the invention can also be used for establishing such connections.

The splitting or coupling of transmission paths in coupling fields in connection with an increase in the transmission reliability is likewise only one exemplary use of the process according to the invention. The method according to the invention can also be used, for example, when establishing conference connections.

What is claimed is:

1. A process for establishing point-to-multipoint connections (A14, A33, A34) and multipoint-to-point connections (B14, B15, B35) in a coupling field comprised of a number of stages (I, II, III), each with a number of switching modules (11–15, 21–25, 31–35), each of which has a number of inputs and outputs that can be freely connected to one another, characterized in that:

when there are switching modules (21–25) in at least one stage (II) in the coupling field, and if, depending on their type, these switching modules are capable of simultaneously splitting the point-to-multipoint connections (A14, A33, A34) and coupling together the multipoint-to-point connections (B14, B15, B35), then the point-to-multipoint connections (A14, A33, A34) are split by those switching modules (25) in which more inputs than outputs are already loaded with connections, and the multipoint-to-point connections (B14, B15, B35) are coupled together by those switching modules (24) in which more outputs than inputs are already loaded with connections.

2. A coupling field, which contains a number of stages (I, II, III), each with a number of switching modules (11–15, 21–25, 31–35) each of which has a number of inputs and outputs that can be freely connected to one another, and a control device, characterized in that:

in at least one stage (II) in the coupling field, there are switching modules (21–25) which, depending on their type, are capable of simultaneously splitting point-to-multipoint connections (A14, A33, A34) and of coupling together multipoint-to-point connections (B14, B15, B35), and that the control device permits the splitting of the point-to-multipoint connections (A14, A33, A34) by those switching modules (25) in which more inputs than outputs are already loaded with connections, and permits the coupling together of the multipoint-to-point connections (B14, B15, B35) by those switching modules (24) in which more outputs than inputs are already loaded with connections.

3. A control device for a coupling field, which contains a number of stages (I, II, III), each with a number of switching modules (11–15, 21–25, 31–35) each of which has a number of inputs and outputs that can be freely connected to one another, characterized in that:

in a coupling field of this kind, in which in at least one stage (II), there are switching modules (21–25) which, depending on their type, are capable of simultaneously splitting point-to-multipoint connections (A14, A33, A34) and of coupling together multipoint-to-point connections (B14, B15, B35), the control device permits the splitting of the point-to-multipoint connections (A14, A33, A34) by those switching modules (25) in which more inputs than outputs are already loaded with connections, and permits the coupling together of the multipoint-to-point connections (B14, B15, B35) by those switching modules (24) in which more outputs than inputs are already loaded with connections.

4. A switching center with a coupling field, which contains a number of stages (I, II, III), each with a number of switching modules (11–15, 21–25, 31–35) each of which has a number of inputs and outputs that can be freely connected to one another, and a control device, characterized in that:

in a coupling field of this kind, in which in at least one stage (II), there are switching modules (21–25) which, depending on their type, are capable of simultaneously splitting point-to-multipoint connections (A14, A33, A34) and of coupling together multipoint-to-point connections (B14, B15, B35), the control device permits the splitting of the point-to-multipoint connections (A14, A33, A34) by those switching modules (25) in which more inputs than outputs are already loaded with connections, and permits the coupling together of the multipoint-to-point connections (B14, B15, B35) by those switching modules (24) in which more outputs than inputs are already loaded with connections.

5. A process according to claim 1, characterized in that:

for the switching modules (21–25), which are simultaneously capable of connecting the point-to-multipoint connections (A14, A33, A34) as well as the multipoint-to-point connections (B14, B15, B35), an asymmetry parameter is supplied to these switching modules as a measure for both the number of inputs loaded with connections and the number of outputs loaded with connections.

\* \* \* \* \*